United States Patent [19]

Isayama et al.

[11] 4,183,029
[45] Jan. 8, 1980

[54] INK FILTER CLOGGING SENSOR AND INDICATOR

[75] Inventors: Takuro Isayama; Takao Fukazawa, both of Tokyo, Japan

[73] Assignee: Ricoh Company, Ltd., Tokyo, Japan

[21] Appl. No.: 935,129

[22] Filed: Aug. 21, 1978

[30] Foreign Application Priority Data

Aug. 23, 1977 [JP] Japan ................... 52-100978

[51] Int. Cl.$^2$ .................. G01D 15/18; G01R 27/02
[52] U.S. Cl. ................. 346/140 R; 324/65 R
[58] Field of Search ............... 346/75, 140 R; 324/61 R, 65 R, 30

[56] References Cited

U.S. PATENT DOCUMENTS

| 1,840,635 | 1/1932 | Parker | 324/30 |
| 2,834,937 | 5/1958 | Raynor | 324/30 |
| 3,264,558 | 8/1966 | Heeps | 324/65 P |
| 3,376,501 | 4/1968 | Peramo | 324/65 P |
| 3,761,953 | 9/1973 | Helgeson et al. | 346/75 |
| 3,820,958 | 6/1974 | Cheng et al. | 324/65 P X |
| 4,007,684 | 2/1977 | Takano et al. | 346/140 R X |
| 4,087,743 | 5/1978 | Bressan | 324/65 P X |

Primary Examiner—George H. Miller, Jr.
Attorney, Agent, or Firm—David G. Alexander

[57] ABSTRACT

An ink filter (15) is provided in an ink supply conduit (12). First and second electrodes (21), (22) are disposed in the conduit (12) upstream and downstream of the filter (15) respectively. A sensor means (23), (24), (27), (28), (32) measures an electrical parameter such as the electrical resistance, capacitance or the like between the electrodes (21), (22) which varies as a function of the degree of clogging of the filter (15). An indicator (34) such as a light or lights (36), analog meter (33) or the like indicates the magnitude of the electrical parameter and thereby whether the filter (15) is clogged or unclogged.

10 Claims, 3 Drawing Figures

INK FILTER CLOGGING SENSOR AND INDICATOR

BACKGROUND OF THE INVENTION

The present invention relates to a sensor and indicator for detecting a clogged condition of an ink filter disposed an ink supply conduit of an ink jet printing apparatus or the like.

Ink jet printers are becoming increasingly popular due to their high speed of operation and print quality. Such printers comprise an ink ejection head which is moved relative to a sheet of paper in the horizontal direction. Ink is supplied to the ink jet head under pressure through a small diameter conduit. During movement of the ink jet head across the paper, electrical pulses are fed to the ink jet head causing ejection of small drops of ink onto the paper. A pulse is fed to the ink jet head at each position at which it is required to print a dark spot or dot on the paper. After printing of one line of dots, the paper is moved relative to the ink jet head in the vertical direction and the ink jet head is again moved horizontally for printing the next line of dots. This operation is continued until an entire page has been printed. An ink jet printer is capable of printing not only alpha-numeric characters but also graphic designs under computer control.

In practical application it has been difficult to prevent clogging of the ink jet head with foreign matter and the like. The problem is compounded by the fact that the ink itself tends to coagulate in its container. For this reason, it is desirable to provide an ink filter in the ink supply conduit. Such an ink filter is capable of preventing a large amount of foreign matter and coagulated ink from reaching the ink jet head to clog the same. However, over a period of time the ink filter itself tends to become clogged.

Ink jet printers known heretofore have not had any means of determining the amount of clogging of the ink filter. Thus, it has been impossible to anticipate the time at which an ink feed failure or stoppage will occur due to excessive clogging of the filter. Since the rate at which the filter becomes clogged as a function of time and ambient operating conditions of the ink jet printer has not been known, it has been impossible to replace the filter after a suitable period of use in such manner that the filter will not become clogged from overuse nor will it be replaced prematurely while it still has a portion of its useful life remaining.

The disruptive effects of a printer failure during a busy business day due to an ink feed stoppage are well known to corporate and government office management personnel. Printer down time is increased due to the fact that it is not possible to determine immediately whether the ink feed stoppage is due to depletion of ink in the supply reservoir, clogging of the ink filter or clogging of the ink jet head. Where it is determined that sufficient ink remains in the reservoir, it has been necessary to disassemble the filter and/or ink jet head to determine the point of stoppage.

SUMMARY OF THE INVENTION

In accordance with the present invention an ink jet printing apparatus includes an ink supply conduit and an ink filter provided in the conduit. First and second electrodes are disposed in the conduit upstream and downstream of the filter respectively. A sensor means is connected to the first and second electrodes for sensing an electrical parameter therebetween which varies as a function of the amount of clogging of the filter.

It is an object of the present invention to provide an ink jet printer comprising an ink filter and means for sensing the amount of clogging of the filter.

It is another object of the present invention to provide an ink jet printer comprising means for indicating when an ink filter starts to become clogged.

It is another object of the present invention to substantially reduce the down time of an ink jet printer.

It is another object of the present invention to provide a generally improved ink jet printing apparatus.

Other objects, together with the foregoing, are attained in the embodiments described in the following description and illustrated in the accompanying drawing.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
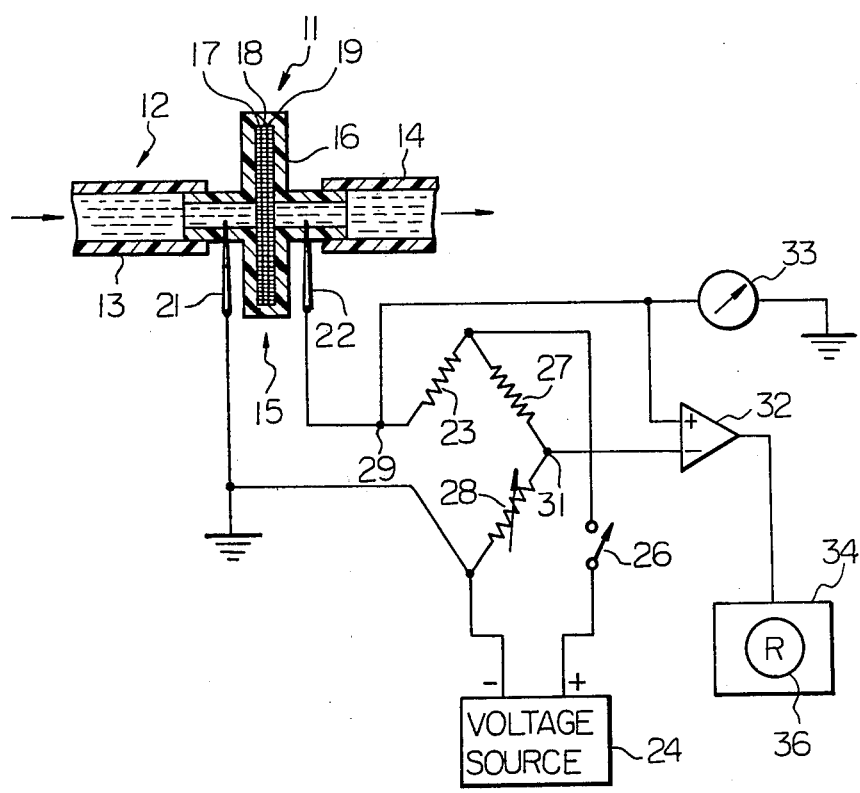
FIG. 1 is a schematic diagram of a first embodiment of the present invention comprising an ink filter, sensor and indicator means.

Referring now to FIG. 1 of the drawing, an ink jet printing apparatus embodying the present invention is shown in fragmentary form and generally designated by the reference numeral 11. The apparatus 11 comprises a conduit 12 leading from an ink reservoir (not shown) to an ink jet or ejection head (not shown). The conduit 12 comprises a tube 13 of small diameter connected to the ink reservoir and a tube 14 of the same size as the tube 13 connected to the ink jet head. An ink filter 15 comprises a casing 16 which connects the tubes 13 and 14 and is made of an electrically non-conductive material. Inside the casing 16 is mounted a first coarse filter mesh 17, a second medium filter mesh 18 and a third fine filter mesh 19 arranged from left to right as viewed in the drawing. As indicated by arrows, ink is adapted to flow rightwardly through the conduit 12.

The purpose of the filter meshes 17, 18 and 19 is to remove particulate matter from the ink flowing from the reservoir to the ink jet head. However, since the filter 15 will eventually become clogged with particulate matter retained by the meshes 17, 18 and 19, it is desirable to detect the clogged condition when it first begins and replace the filter 15 before an ink feed stoppage can occur.

For this reason, in accordance with the present invention a first electrode 21 is attached to the casing 16 in such a manner as to intrude into the ink upstream of the meshes 17, 18 and 19. A similar second electrode 22 intrudes into the ink downstream of the filter meshes 17, 18 and 19. The first electrode 21 is grounded. The second electrode 22 is connected through a fixed resistor 23 and a switch 26 to a constant voltage source 24.

Further connected between the voltage source 24 and ground through the switch 26 are a fixed resistor 27 and a variable resistor 28. The junction of the electrode 22 and the resistor 23 is designated as a circuit point 29. The junction of the resistors 27 and 28 is designated as a circuit point 31. The circuit point 29 is connected to a non-inverting input of a voltage comparator 32 and also to ground through an analog voltmeter 33. The circuit point 31 is connected to an inverting input of the comparator 32. The output of the comparator 32 is connected to an indicator 34 provided with a red lamp or light 36.

The electrical resistance between the electrodes 21 and 22 varies in accordance with the electrical resistivity of the ink therebetween. Generally, as the filter 15 becomes clogged with electrically non-conductive foreign matter such as dirt particles or the like, the electrical resistance between the electrodes 21 and 22 will increase. Thus, the electrical resistance between the electrodes 21 and 22 corresponds to the electrical resistivity of the ink in the filter 15 and thereby to the amount of clogging of the filter 15.

The resistors 23, 27 and 28 constitute a Wheatstone resistance bridge for measuring the resistivity of the ink in the filter 15. The resistors 27 and 28 constitute a first voltage divider for producing a predetermined constant voltage at the circuit point 31 which is fed to the inverting input of the comparator 32 as a reference value. The resistor 23 in combination with the resistance between the electrodes 21 and 22 constitute a second voltage divider, the output of which appears at the circuit point 29 and is applied to the non-inverting input of the comparator 32 for comparison with the reference value. When the voltage at the circuit point 29 exceeds the voltage at the circuit point 31, the comparator 32 produces a high output which turns on the light 36.

In operation, the resistor 28 is adjusted so that the voltage at the point 31 is slightly higher than the voltage at the point 29 when the filter 15 is unclogged. As the filter 15 begins to become clogged, the electrical resistance between the electrodes 21 and 22 increases and thereby the voltage at the point 29 increases. As the voltage at the point 29 exceeds the voltage at the point 31, the light 36 is turned on to inform the operator of the apparatus 11 that the filter 15 has begun to become clogged and should be replaced in order to avoid an ink supply stoppage.

In some applications, the filter 15 will become clogged with electrically conductive foreign matter such as metal particles. In such a case, the electrical resistance between the electrodes 21 and 22 will increase rather than decrease. In such a case, it is merely necessary to reverse the connections of the inputs of the comparator 32 to light the light 36 as the filter 15 becomes clogged.

Naturally, it is well within the scope of the invention to replace the light 36 with an audio annunciator such as a bell, buzzer, siren or the like to inform the operator of the apparatus 11 that the filter 15 has begun to become clogged.

The voltmeter 33 gives an analog indication of the voltage at the point 29 and thereby the magnitude of clogging of the filter 15. The voltmeter 33 may, as desired, be provided in addition to the indicator 34 or replace the indicator 34. It will be noted that the electrodes 21 and 22 in combination with the resistors 23, 27 and 28 constitute a sensor means for sensing the resistivity of the ink in the filter 15.

Figure 2:
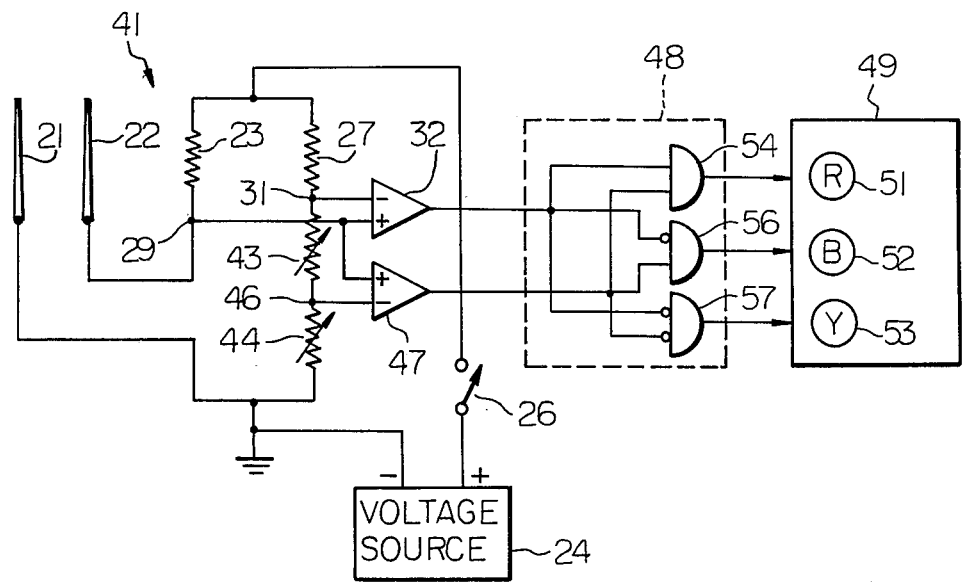
FIG. 2 is a schematic diagram illustrating another embodiment of the sensor and indicator means.

FIG. 2 shows a modified embodiment of the present invention which is generally designated as 41. The apparatus 41 is adapted to indicate not only whether the filter 15 is becoming clogged but also whether the filter 15 is becoming clogged with electrically conductive or non-conductive material. Like elements are designated by the same reference numerals used in FIG. 1.

In the apparatus 41 the resistor 28 is replaced by variable resistors 43 and 44 connected in series. The junction of the resistors 43 and 44 is designated as a circuit point 46. The circuit point 29 is connected to a non-inverting input of a voltage comparator 47. The circuit point 46 is connected to an inverting input of the comparator 47. The resistors 43 and 44 are adjusted so that a voltage V2 which corresponds to the reference level in the apparatus 11 appears at the circuit point 31 and a lower voltage V1 appears at the circuit point 46. The voltage V1 is selected to be slightly lower than the voltage at the circuit point 29 when the filter 15 is unclogged.

The outputs of the comparators 32 and 47 are connected through a decoder 48 to an indicator 49 provided with a red light 51, a blue light 52 and a yellow light 53. The decoder 48 comprises an AND gate 54 having non-inverting inputs connected to the outputs of the comparators 32 and 47 respectively. The output of the AND gate 54 is arranged to turn on the red light 51 when logically high.

The decoder 48 further comprises an AND gate 56 having an inverting input connected to the output of the comparator 32 and a non-inverting input connected to the output of the comparator 47. A logically high output of the AND gate 56 turns on the blue light 52.

The decoder 48 yet further comprises an AND gate 57 having inverting inputs connected to the outputs of the comparators 32 and 47 respectively. A logically high output of the AND gate 57 turns on the yellow light 53.

When the voltage at the circuit point 29, designated as V3, is between the voltages V1 and V2, which occurs when the filter 15 is not clogged, the comparator 47 will produce a high output whereas the comparator 32 will produce a low output. Under these conditions only the AND gate 56 produces a high output to turn on the blue light 52.

If the filter 15 becomes clogged with electrically non-conductive matter, the voltage V3 will exceed the voltage V2 and both comparators 32 and 47 will produce high outputs. Only the AND gate 54 produces a high output to turn on the red light 51.

If the filter 15 becomes clogged with electrically conductive matter, the voltage V3 will be lower than the voltage V1 and both comparators 32 and 47 will produce low outputs. Only the AND gate 57 will produce a high output to turn on the yellow light 53. Thus, merely by looking to see which light 51, 52 or 53 is lighted, the operator of the apparatus 11 can tell whether the filter 15 is clogged or unclogged, and if clogged, whether the filter 15 is clogged with electrically conductive or non-conductive matter.

Where is it merely desired to determine whether the voltage V3 is between the voltages V1 and V2 or not, the outputs of the comparators 32 and 47 can be connected to inputs of an exclusive OR gate (not shown). The exclusive OR gate will produce a high output when the voltage V3 is between the voltage V1 and V2 and produce a low output when the voltage V3 is below the voltage V1 or above the voltage V2.

Alternatively, the outputs of the comparators 32 and 47 can be connected to inputs of an exclusive NOR gate (not shown). In this case, the exclusive NOR gate will produce a low output when the voltage V3 is between the voltages V1 and V2 and produce a high output when the voltage V3 is below the voltage V1 or above the voltage V2.

The following table summarizes the logical conditions of the apparatus 41 shown in FIG. 2.

Table

|  |  | V3 < V1 | V1 < V3 < V2 | V2 < V3 |
|---|---|---|---|---|
| Comparator output | 32 | 0 | 0 | 1 |
|  | 47 | 0 | 1 | 1 |
| Filter condition |  | clogged with conductive matter | unclogged | clogged with non-conductive matter |
| Lamp on |  | Yellow | Blue | Red |

In the embodiments of FIGS. 1 and 2, the voltage source 24 may produce electrolysis of the ink in the filter 15 due to passage of electrical current therethrough. To minimize such electrolysis, the switch 26 is provided. The switch 26 is normally open and is momentarily closed by the operator of the apparatus 11 or 41 to determine the state of the filter 15.

Figure 3:
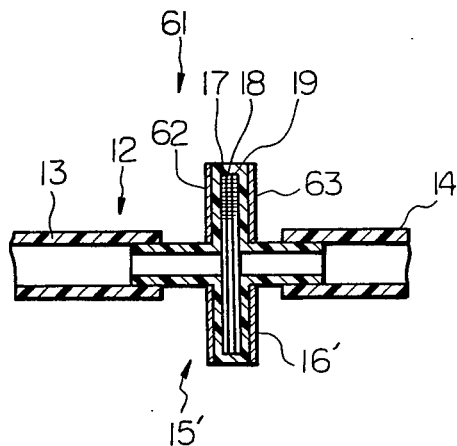
FIG. 3 is a sectional view illustrating another embodiment of the sensor means.

It is possible within the scope of the present invention to measure some electrical parameter other than resistance to determine the amount of clogging of the ink filter. In an apparatus 61 shown in FIG. 3 an ink filter 15' is modified in such a manner as to accommodate first and second electrodes 62 and 63 in the form of annular plates on the left and right sides of a casing 16'. The electrodes 62 and 63 in combination with the filter 15' and the ink therein constitute a capacitor, the capacitance of which varies in accordance with the amount of clogging of the filter 15'. This is because the dielectric constant of the ink in the filter 15' varies in accordance with the proportion of solid matter in the filter 15'. Generally, the capacitance between the electrodes 62 and 63 will increase as the filter 15' becomes clogged since the proportion of solid matter will increase and the dielectric constant will also increase. However, the capacitance may decrease if the filter 15' becomes clogged with electrically conductive matter.

The capacitance across the electrodes 62 and 63 may be measured by any means known in the art. For example, although not shown, the electrodes 62 and 63 may be connected across a coil to constitute a resonant circuit of an oscillator, the frequency of which varies in accordance with the amount of clogging of the filter 15'.

In summary, the present invention provides a novel sensor and indicator means for an ink jet printer which measure the amount of clogging of an ink filter and indicate when the filter should be changed to prevent an ink feed stoppage. The present invention further constitutes an economical means for preventing maintenance personnel from replacing the ink filter prematurely out of ignorance of the condition of the filter. Various modifications will become possible for those skilled in the art after receiving the teachings of the present disclosure without departing from the scope thereof.

What is claimed is:

1. In an ink jet printing apparatus having an ink supply conduit and an ink filter provided in the conduit, the combination characterized by comprising:
    a first electrode provided in the conduit upstream of the filter;
    a second electrode provided in the conduit downstream of the filter; and
    sensor means connected to the first and second electrodes for sensing an electrical parameter therebetween.

2. An apparatus as in claim 1, in which the electrical parameter is an electrical capacitance.

3. An apparatus as in claim 1, further comprising an analog indicator for indicating the electrical parameter.

4. An apparatus as in claim 1, in which the electrical parameter is an electrical resistance.

5. An apparatus as in claim 4, in which the sensor means comprises a resistance bridge.

6. An apparatus as in claim 1, further comprising indicator means connected to the sensor means for indicating whether the electrical parameter is above or below a predetermined value.

7. An appartus as in claim 6, in which the indicator means comprises a light.

8. An apparatus as in claim 1, further comprising indicator means connected to the sensor means for indicating whether the electrical parameter is below a first predetermined value, between the first predetermined value and a second predetermined value which is higher than the first predetermined value or above the second predetermined value.

9. An apparatus as in claim 8, in which the indicator means comprises lights.

10. An apparatus as in claim 8, in which the indicator means comprises first and second comparators having reference levels set to the first and second predetermined values respectively and decoder means for decoding outputs of the comparators.

* * * * *